INVENTOR.
CLYDE STEWART

Jan. 24, 1961 C. STEWART 2,969,540
ELECTROMECHANICAL PHASE DETECTOR FOR RADIO SEXTANTS
Filed July 2, 1958 2 Sheets-Sheet 2
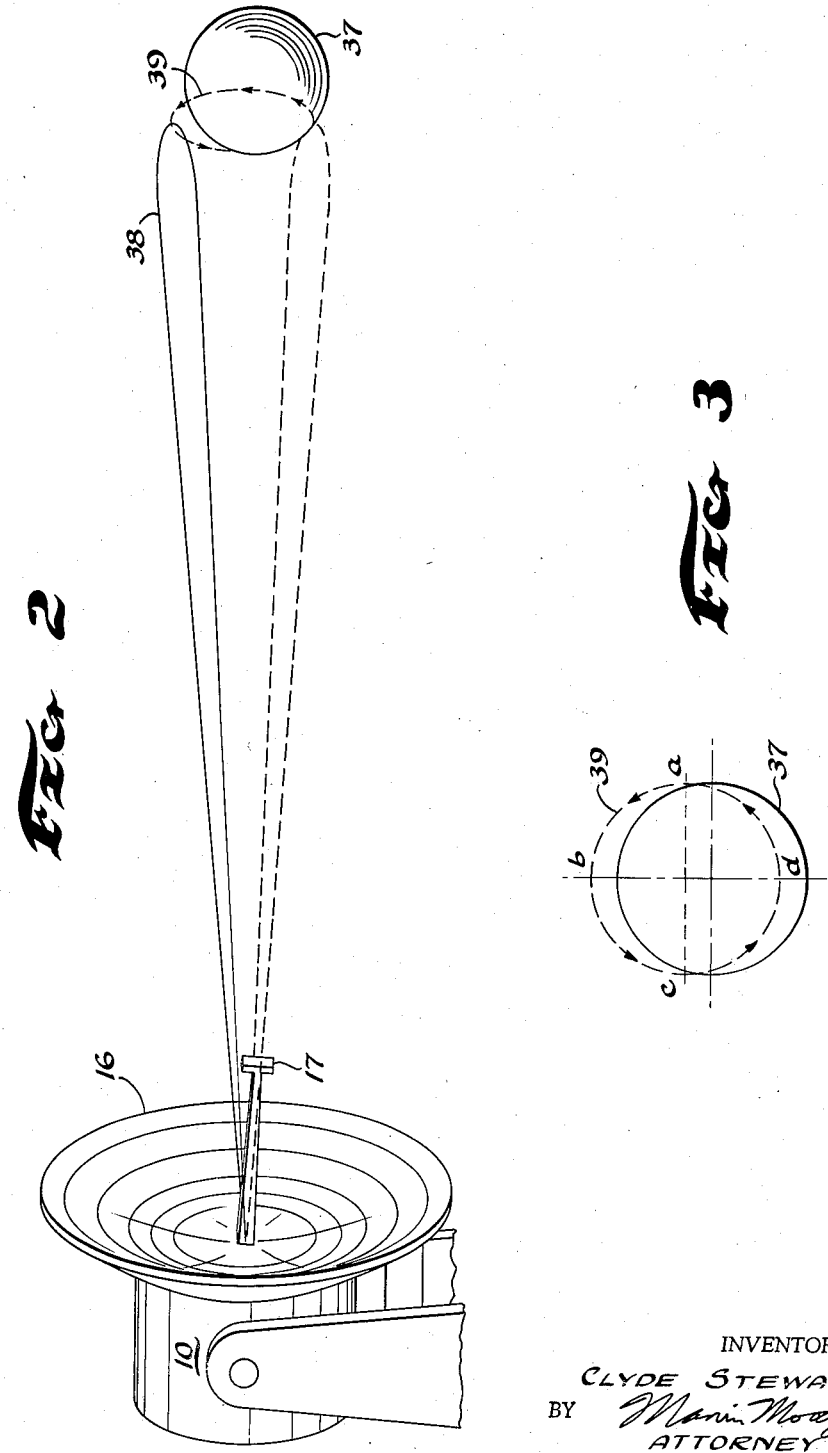
INVENTOR.
CLYDE STEWART
BY *Marvin Moody*
ATTORNEY
*Glenn H. Antrim*
AGENT United States Patent Office 2,969,540
Patented Jan. 24, 1961

2,969,540

ELECTROMECHANICAL PHASE DETECTOR FOR RADIO SEXTANTS

Clyde Stewart, Cedar Rapids, Iowa, assignor to Collins Radio Company, Cedar Rapids, Iowa, a corporation of Iowa Filed July 2, 1958, Ser. No. 746,582

1 Claim. (Cl. 343—117)

This invention pertains to radiant energy receiving systems that have nutating antennas and pertains particularly to means for determining the position of a target relative to the wave pattern of the antenna beam when the antenna is being nutated slowly. An antenna system that provides for slow nutation is particularly applicable to a radiometric sextant that continually points toward the sun as an aid in navigation.

The radiometric sextant is similar to a radar tracking system in that an antenna pattern is nutated about an axis that extends from the antenna to a distant object. Receiving circuits that are connected to the antenna include means for detecting energy that is radiated from a distant object and phase detecting circuits that are synchronized with the nutation of the antenna. The relative intensity of the detected output for different phases determines the direction the antenna is to be positioned to point at the object that is being tracked. When radar is employed to track aircraft or other rapidly moving objects, the rate of nutation of the antenna must be rapid in order to receive information rapidly enough to cause electronically controlled tracking mechanisms to maintain the antenna in the direction of an object that is being tracked. Similar equipment that nutates the antenna at a relatively rapid rate, for example, at 1800 revolutions per minute, has been applied to radiometric systems. The relatively rapid rate of rotation facilitates detection of received signal by a usual electronic phase detector and readily provides a reference signal from a generator that is driven by the same motor that nutates the antenna. This reference signal is required for application to a phase detector. Should the rate of nutation be decreased substantially, the design of a suitable generator and of a phase detector of the usual type would be difficult.

Obviously, since the apparent angular movement of the sun is at a slow rate, a rapid rate of nutation is unnecessary for tracking the sun. In the present invention the usual generator and electronic phase detector are replaced with an electromechanical phase detector. The electromechanical phase detector permits the antenna to be nutated slowly so that wear on the precise nutational mechanism is greatly reduced over that encountered in former systems. Accordingly the electromechanical phase detector of this invention comprises capacitors that correspond to different phases of nutation, a first switching means that is operated in synchronism with the nutation of the antenna to charge each of the capacitors according to signal strength that is received during the interval that the respective capacitor is connected by said first switching means, and a second switching means that operates at a relatively high switching rate to connect alternately said capacitors to the input of a servo positioning system so that the antenna is positioned by the servo system until the voltages that are applied to the capacitors are equal.

An object of the invention is to provide a simple, reliable, radiant energy receiving system that permits a slow rate of nutation of an antenna that is tracking a target that is moving at a slow angular velocity relative to the antenna.

The following description and the appended claim may be more readily understood with reference to the accompanying drawings in which:

Figure 2 is a diagram showing in perspective the nutation of an antenna beam relative to the object that is being tracked; and Figure 3 is a plane view of the path of a nutated field pattern of an antenna relative to the sun.

Figure 1:
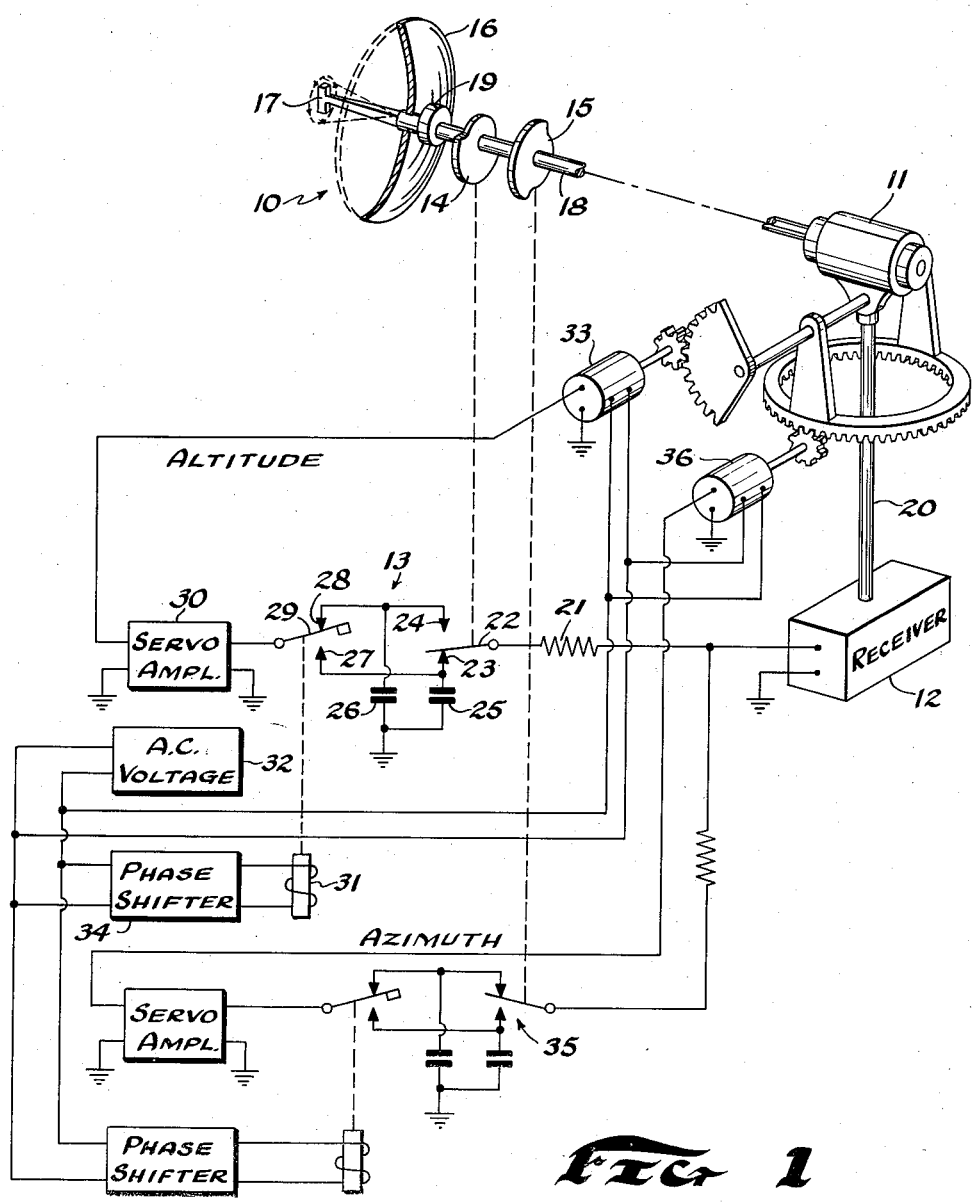
Figure 1 is a schematic diagram of the receiving system that includes the electromechanical phase detector of this invention.

Briefly, in the system of Figure 1, antenna 10 that is nutated by motor 11 provides input signal to receiver 12. Signal at the output of the receiver varies in amplitude at the frequency of nutation when the axis about which the pattern of the antenna is nutated is not quite centered on the radiating body that is being tracked. The output circuit of the receiver is connected to the electromechanical phase detector circuit 13 of this invention for providing error signal to the input of a servo system that operates in a conventional manner to position the receiving antenna. The phasing of the mechanical servo systems required for positioning the antenna in altitude and in azimuth is provided by cams 14 and 15 respectively that are driven by nutational motor 11. This system differs from prior radiometric receiving systems in that the electromechanical phase detector 13, that includes input contacts that are synchronized with the antenna and output contacts that are part of a chopper, replaces the conventional phase-reference generator and electronic phase detector.

In this description, the system shown in Figure 1 is considered to be adapted for tracking the sun. The antenna and the receiver may be designed to operate in the microwave regions, for example 8.7 millimeters.

More particularly the antenna system 10 of Figure 1 includes a parabolic reflector 16 having a cutler feed 17. The waveguide of the cutler feed is connected through eccentric bearing 19 and waveguide section 18 to nutational motor 11 which operates at a slow rate, for example, five revolutions per second. A received signal is applied through waveguide sections 18 and 20 to the input of microwave receiver 12. When the axis of nutation of the wave pattern of the antenna is pointing directly toward the center of the sun, the input signal is unmodulated but when the axis of nutation is displaced slightly from the vector that extends between the antenna and the center of the sun, the input signal is modulated at a frequency that corresponds to the rate of rotation of nutational motor 11. Receiver 12 amplifies and detects the input signal so that a voltage varying at the modulating frequency is applied to the output of the receiver.

The output of the receiver is connected through isolating resistor 21 to armature 22 which is operated by cam 14 to engage alternately contacts 23 and 24. Armature contact 22 is therefore synchronized with the frequency of the demodulated signal that is applied from the output of the receiver. During an interval that is required for cam 14 to rotate slightly less than 180°, the output of the receiver is connected through armature 22 and contact 23 to capacitor 25 so that a charging current that is proportional to the output voltage of the receiver flows to capacitor 25 during a corresponding phase of the nutational cycle of the antenna. During a succeeding one-half cycle of the nutational phase the output of receiver 12 is applied through armature 22 and contact 24 to capacitor 26 so that the charging current applied to capacitor 26 is determined by the voltage that is then present at the output of receiver 12. Capacitors 25 and 26 are also connected alternately through contacts 27 and 28 respectively to chopper armature 29 that is connected to the input of servo amplifier 30.

When the antenna is not pointing directly at the sun, a difference voltage appears between contacts 27 and 28 so that a square wave that has a frequency corresponding to the rate of vibration of chopper 31 is applied to the input of the servo amplifier 30. Obviously the frequency of operation of chopper 31 is independent of the nutational rate of the antenna and is dependent only upon the frequency of the source of alternating-current voltage 32. The output of the servo amplifier 30 is applied to one winding of the two-phase servo motor 33. The servo motor which operates in the usual manner, rotates in a direction that is determined by the phase of the signal received from antenna 10 and thereby rotates antenna 10 in a vertical plane about a horizontal axis. The other winding of motor 33 is connected directly to the source of alternating-current voltage 32. In order that the voltages which are applied to the two windings of motor 33 are either in phase, or 180° out of phase, phase shifter 34 has been inserted between the alternating-current voltage source 32 and chopper winding 31 so that the phase of chopper armature 29 may be synchronized with the alternating-current voltage source 32.

An azimuth controlled channel that includes an electromechanical phase detector 35 is also connected to the output of receiver 12. This controlled channel is similar to the altitude control channel and is effective in controlling the operation of servo motor 36 for directing antenna 10 to the desired azimuth position. The azimuth control channel differs from the altitude control channel in that the armature at the input of the electromechanical phase detector is operated 90° out of phase with that of the altitude channel. This difference in phase is accomplished by having cams 14 and 15 positioned on rotary waveguide 18 such that an angle of 90° exists between corresponding points on the face of the cam relative to their respective armatures of the electromechanical phase detectors 13 and 35.

The operation of the circuit in Figure 1 may be more readily understood with reference to a specific example as illustrated in Figures 2 and 3. Figure 2 shows diagrammatically the rotation of the field pattern 38 to describe the path 39 with respect to the sun 37. The axis about which the field pattern is being rotated is considered to be slightly above the vector that extends between the antenna and the center of the sun to describe the path as shown in Figure 3. The path as represented by line 39 may be considered to be a projection of the direction in which the antenna is most sensitive for receiving a maximum amount of energy for application to receiver 12. Obviously during the interval that the antenna is directed for describing the path from "a" through "b" to "c," it is not directed as closely to the sun as during the interval when the antenna describes a path as shown from "c" through "d" to "a." Let it be assumed during the interval that the antenna is directed along abc that cam 14 is positioned such that armature 22 engages contact 23 and likewise for the path cda that armature 22 engages contact 24. Since the energy received for the path cda is greater than for the path abc, a greater voltage is present at the output of the receiver 12 during that interval when armature 22 engages contact 24 for connecting capacitor 26. If the polarity of the output voltage that is applied to armature 22 is positive with respect to ground, the voltage applied through contact 28 to the input of servo amplifier 30 is more positive than the voltage that is applied through contact 27. The operation of chopper 31 therefore applies a square wave to the input of servo amplifier 30 and the applied voltage has the required phase for causing servo motor 33 to operate in the direction for rotating antenna 10 downward.

When the axis about which the antenna beam is being rotated becomes coincident with the vector between the antenna and the center of the sun, the voltage across capacitor 25 becomes equal to the voltage across capacitor 26 so that no difference in voltage exists for application through armature 29 to servo amplifier 30, and consequently servo motor 33 ceases to operate. Obviously, when the radio beam is centered below the sun, the voltage across capacitor 25 is greater than the voltage across capacitor 26 so that the phase of the voltage applied to servo amplifier 30 is changed 180° to cause servo motor 33 to operate in the reverse direction.

The azimuth control circuit, other than operating 90° out of phase with respect to the altitude control circuit as related to the nutational cycle of the antenna, operates according to the description for the altitude control circuit. The control circuit operates in response to an error in the positioning of the antenna in azimuth to operate servo motor 36.

Cams 14 and 15 and associated switches at the inputs of electromechanical phase detectors 13 and 35 may be readily replaced by other switching arrangements that perform the same switching function. For example, a pair of commutating type switches that are driven by the nutational motor operate very satisfactorily. Each of these switches have rotary segments of nearly 180° that are contacted by brushes that are mounted similarly to those in small electric motors. Obviously the rotors are coupled to the nutational motor so that the segments of one are at an angle of 90° with respect to the other.

Several advantages are obtained through the use of the electromechanical phase detector of this invention in a radiometric receiving system. The antenna may be nutated at a frequency with a lower limit which is determined only by the rate at which information must be obtained to track the target. For example, in tracking the sun or moon the rate of nutation may be five cycles per second or less. The frequency of the alternating-current voltage that is applied to the chopper in the output circuit of the electromechanical phase detector is not critical and for convenience may be either 60 or 400 cycles per second. Through the use of this reliable phase detector, the phase reference generator that is usually coupled to the nutational motor is not required. The cam operated switches that replace the diode in the usual circuit have ideal characteristics compared with the diode and there is usually no change in characteristic such as associated with a tube or a semi-conductor diode detector. The electromechanical phase detectors may be modified for application to systems that are different from that shown in Figure 1 and still be within the spirit and scope of the following claim.

What is claimed is:

In a radiometric sextant having a receiver, a nutational antenna connected to the input of said receiver, and an altitude and an azimuth servo system for directing said antenna; an altitude electromechanical phase detector connected between the output of said receiver and the input of said altitude servo system, an azimuth electromechanical phase detector connected between the output of said receiver and the input of said azimuth servo system, each of said phase detectors comprising first and second capacitors, switching means for each of said detectors, each of said switching means being connected to the output of said receiver, and an electromechanical chopper for each detector, means for operating said choppers for connecting alternately respective ones of said capacitors across the input of the respective one of said servo systems, nutating means for nutating said antenna and for operating each of said switching means in synchronism with the nutational cycle of said antenna, each of said switching means operating for alternately connecting said respective first and second capacitors to produce a difference voltage between said capacitors of said altitude electromechanical filter in response to an error in positioning said antenna in altitude and to produce a difference voltage between said capacitors of said azimuth electromechanical filter in response to an error in positioning said antenna in azimuth, and each of said servo systems responsive to the application of difference voltage from respective capacitors through a respective one of said choppers to position said antenna.

References Cited in the file of this patent

UNITED STATES PATENTS 2,449,517 Stout _____ Sept. 14, 1948